Sept. 2, 1969     F. B. BIELFELDT     3,464,091

INJECTION MOLDING MACHINE

Filed Sept. 8, 1966     5 Sheets-Sheet 1

INVENTOR
Friedrich Bernd Bielfeldt by
Michael S. Striker

Sept. 2, 1969  F. B. BIELFELDT  3,464,091
INJECTION MOLDING MACHINE
Filed Sept. 8, 1966  5 Sheets-Sheet 4

INVENTOR
Friedrich Bernd Bielfeldt

By
Michael J. Striker

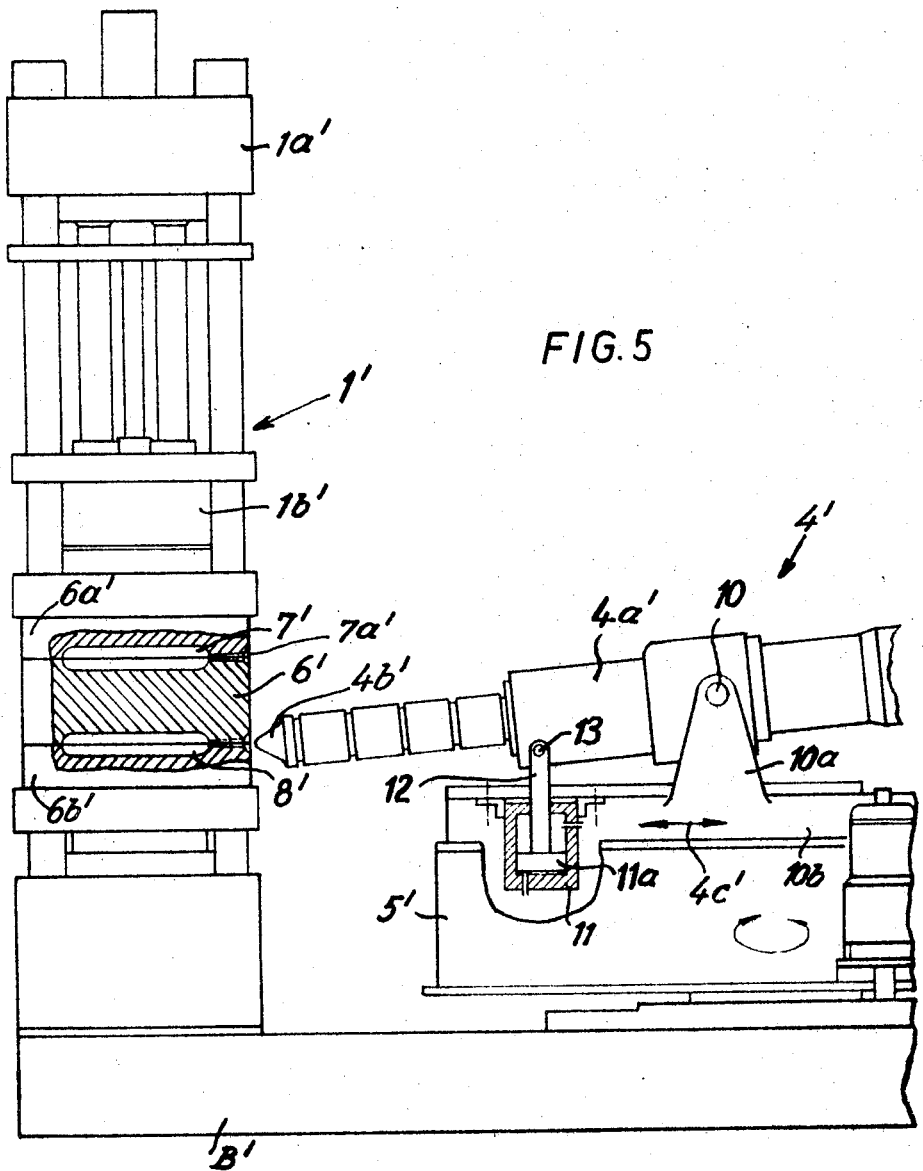

United States Patent Office 3,464,091
Patented Sept. 2, 1969

3,464,091
INJECTION MOLDING MACHINE
Friedrich Bernd Bielfeldt, Pappenheim, Germany, assignor to Eckert und Ziegler G.m.b.H., Weissenburg, Bavaria, Germany
Filed Sept. 8, 1966, Ser. No. 578,018
Claims priority, application Germany, Sept. 16, 1965,
E 30,111
Int. Cl. B29f 1/00
U.S. Cl. 18—30                                          9 Claims

ABSTRACT OF THE DISCLOSURE

An injection molding machine wherein the shooting cylinder is pivotable about a vertical axis and about a horizontal axis so as to move its nozzle into registry with a selected one of several multi-stage mold units and into registry with the inlet of a selected mold cavity in the selected mold unit. The cylinder is mounted on a horizontal pivot carried by a slide which is reciprocable in a horizontal plane on a turntable rotating about the vertical axis.

---

The present invention relates to injection molding machines in general, and more particularly to improvements in injection molding machines of the type having a plurality of molds whose cavities preferably receive plasticized material from a single shooting cylinder.

It is already known to provide an injection molding machine with a plurality of multi-section molds which are disposed in a circle around a turnable shooting cylinder. The shooting cylinder is reciprocable axially toward and away from the inlets of mold cavities in the molds. The purpose of such multiple-mold injection molding machines is to reduce the length of intervals between successive injections of plasticized material, especially when the plasticized material is a thermosetting substance. However, these machines have found limited acceptance because, and particularly if the mold cavities are dimensioned to accommodate large quantities of plasticized material, the intervals necessary for setting of material in such cavities are so long that the machine must be provided with an exceptionally large number of molds. This insures that the shooting cylinder injects plasticized material at frequent intervals and that the material in the shooting cylinder cannot undergo undesirable chemical or other changes. The complicatedness, space requirements and initial as well as maintenance cost of an injection molding machine increase considerably with the number of molds because the number of molds will determine the number of necessary mold closing and clamping devices as well as the number of components in the programming system which regulates the sequence of mold opening, closing, sealing, clamping, locking and injecting steps.

In accordance with a more recent proposal, the molds are disposed in two superimposed stages and the machine comprises two shooting cylinders which receive plasticized material from the branches of a single distributor. The cost of programming and mold closing and clamping devices in such machines is lower but the admission of plasticized material through a single distributor presents serious problems, not only because the separation of such distributor consumes much time but also because substantial quantities of plasticized material are wasted whenever the machine is to be converted for production of different types of plastic articles.

Accordingly, it is an important object of the present invention to provide a novel and improved injection molding machine wherein plasticized material may be injected into a plurality of molds and wherein the shooting cylinder can inject plasticized material at frequent intervals despite the fact that the machine preferably comprises a relatively small number of molds.

Another object of the invention is to provide an injection molding machine wherein a single shooting cylinder suffices to supply plasticized material to several molds and wherein such single shooting cylinder may be rapidly and conveniently placed into requisite position for injection of plasticized material into the cavity of a selected mold.

A further object of the invention is to provide an injection molding machine wherein a single mold opening, closing and clamping or sealing device suffices to manipulate the sections of two or more molds.

An additional object of the invention is to provide an injection molding machine which occupies little room, wherein the movements of the mold sections and of the shooting cylinder can be controlled by a very simple programming system, and wherein the intervals between successive injections of plasticized material are reduced to a minimum so that the material in the shooting cylinder has no time to undergo changes in consistency and/or composition.

Briefly stated, one feature of the present invention resides in the provision of an injection molding machine which comprises a multi-stage mold unit defining a row of preferably superimposed mold cavities each having an inlet, a shooting unit whose cylinder is provided with a nozzle for injecting plasticized material into one of the cavities at a time, and shifting means for moving one of the units with reference to the other unit between a plurality of positions in each of which the nozzle registers with the inlet of one of the cavities.

If the mold unit is stationary, the shifting means may be arranged to move the shooting unit between a plurality of positions by moving the nozzle between different levels at each of which such nozzle registers with a different inlet. On the other hand, and if the mold unit is to be shifted with reference to the shooting unit, the shifting means may comprise an assembly for moving the mold unit up and down to thereby place selected inlets into registry with the nozzle.

The injection molding machine preferably comprises at least one additional multi-stage mold unit and the cylinder of the shooting unit is preferably turnable about a vertical axis between a plurality of angular positions in each of which its nozzle may be placed into registry with the inlet of a selected cavity in one of the mold units. For example, and if the machine comprises a total of three mold units each of which defines at least two superimposed mold cavities, the cylinder of the shooting unit will be movable between three angular positions in each of which its nozzle is located in line with the inlets of cavities in the respective mold unit.

The novel features which are considered as characteristic of the invention are set forth in particular in the appended claims. The improved injection molding machine itself, however, both as to its construction and its mode of operation, together with additional features and advantages thereof, will be best unterstood upon perusal of the following detailed description of certain specific embodiments with reference to the accompanying drawings, in which:

FIG. 5 is a similar fragmentary side elevational view but showing the nozzle in a lower end position.

Figure 1:
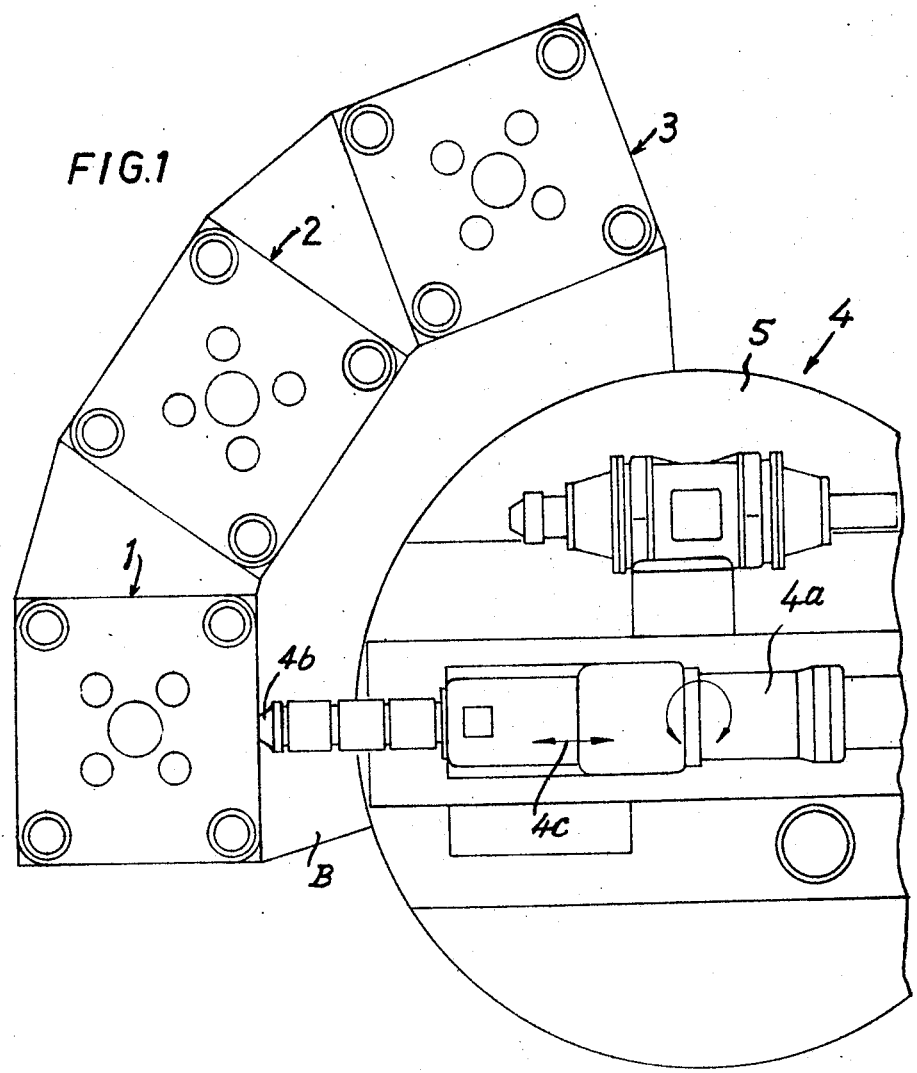
FIG. 1 is a fragmentary schematic top plan view of an injection molding machine which embodies one form of my invention and wherein the mold units are movable up and down.
Figure 2:
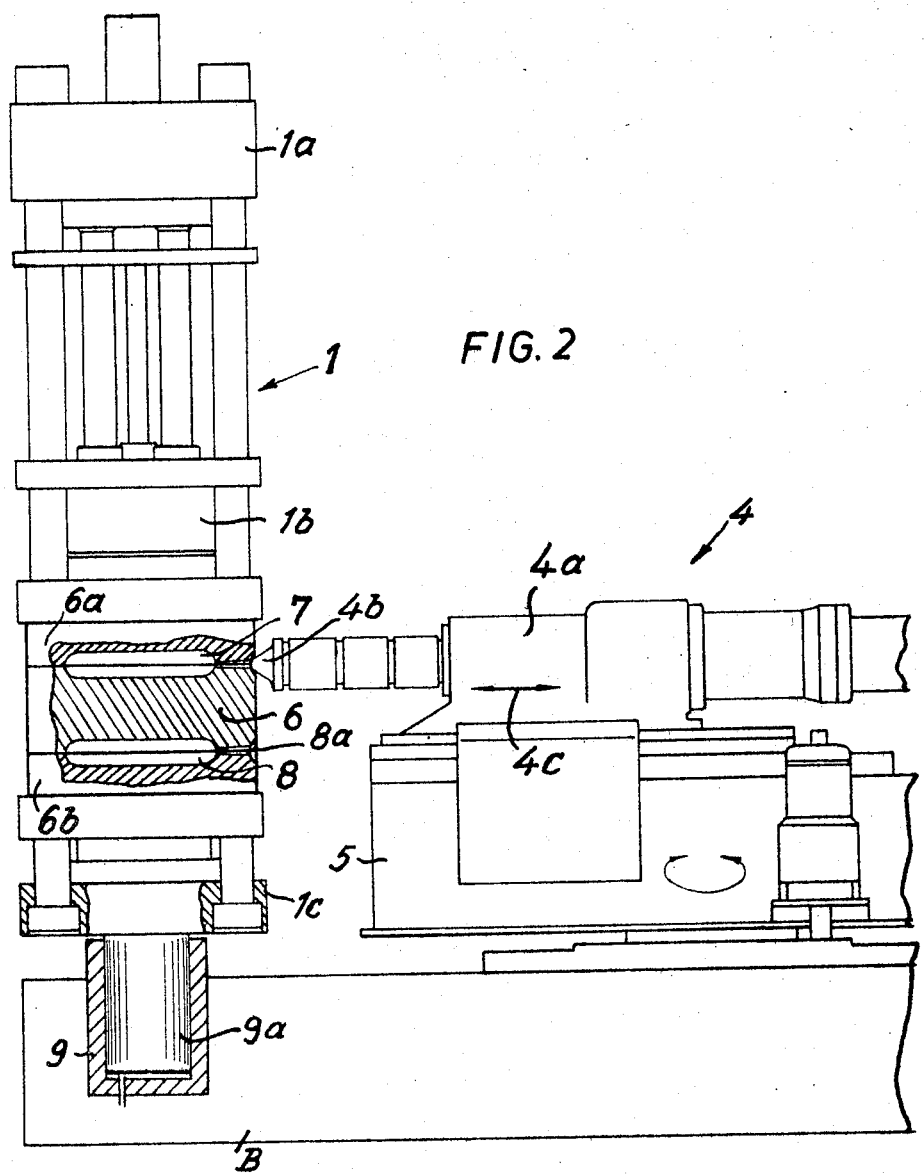
FIG. 2 is a fragmentary side elevational view of the injection molding machine and illustrates one of the mold units in its lower end position in which the inlet of the upper cavity in such mold unit registers with the nozzle of the shooting cylinder.
Figure 3:
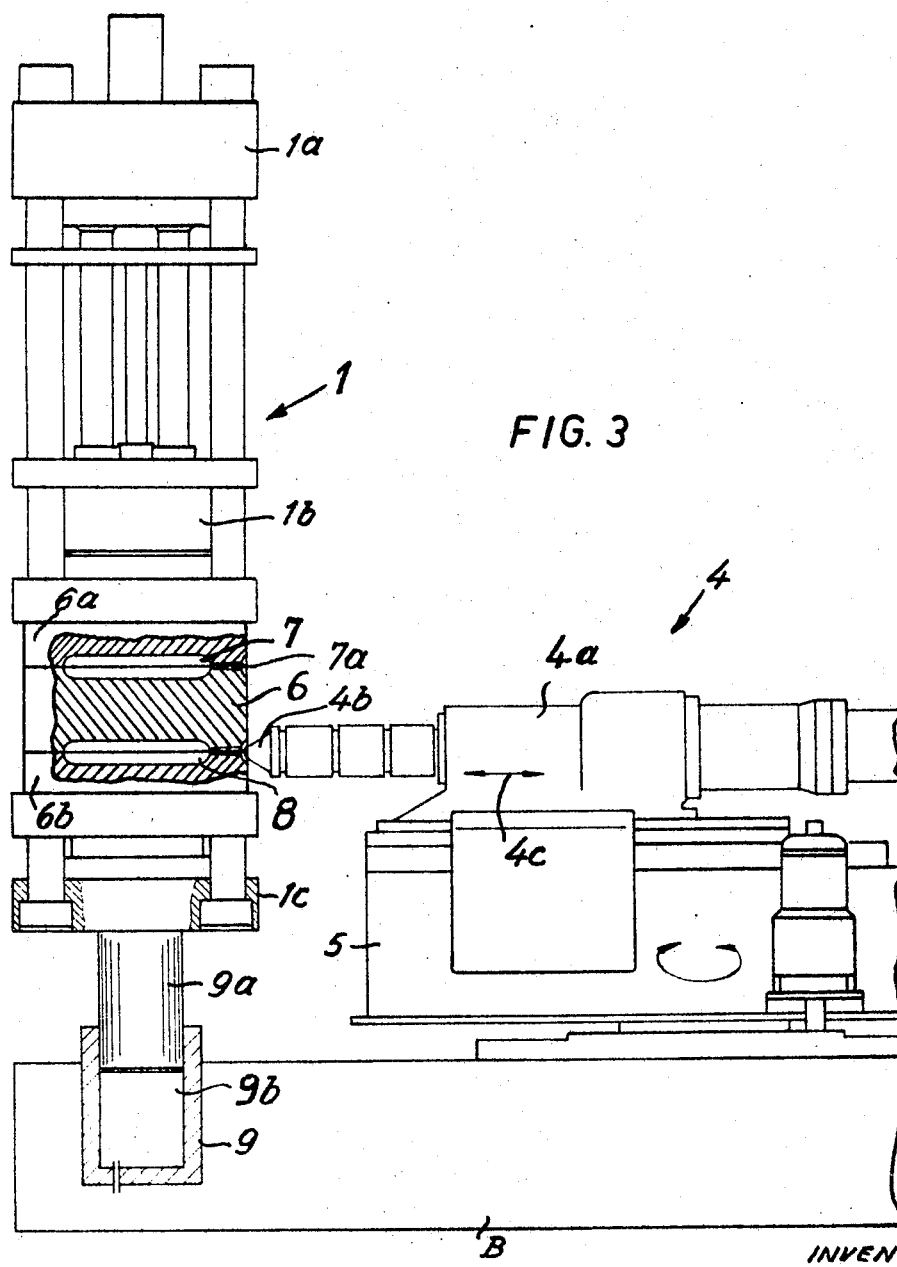
FIG. 3 is a similar fragmentary side elevational view but showing the one mold unit in its lower end position.

Referring first to FIG. 1, there is shown an injection molding machine which comprises three identical two-stage mold units 1, 2 and 3. The construction of the mold unit 1 is shown in FIGS. 2 and 3. The machine further comprises a shooting unit 4 including a turntable 5 which is rotatable about a central vertical axis and carries a horizontal shooting cylinder 4a having a nozzle 4b. The cylinder 4a is reciprocable axially with reference to the turntable 5 as indicated by the arrow 4c.

The mold unit 1 shown in FIGS 2 and 3 comprises two superimposed molds having a common median section 6 and additional sections 6a, 6b cooperating with the section 6 to define therewith two mold cavities 7, 8 when the molds are closed. The cavities 7, 8 are respectively provided with inlets 7a, 8a which face the vertical axis of the turntable 5. The mold sections 6, 6a are movable toward and away from each other and from the mold section 6b by a mold opening and closing mechanism 1a shown at the top of FIGS. 2 and 3. The mold unit 1 further comprises a clamping mechanism 1b which can apply to the mold sections 6, 6a, 6b a sealing pressure at the time when the nozzle 4b is introduced into the inlet 7a or 8a and injects plasticized material into the respective mold cavity. The exact construction of the mechanisms 1a and 1b forms no part of the present invention.

In the embodiment of FIGS. 1 to 3, each of the mold units 1, 2 and 3 is movable up and down to place its inlet 7a or 8a into the horizontal plane of the nozzle 4b. The shifting means for effecting such movement of the mold unit 1 includes a hydraulic cylinder 9 which is installed in a base B and a piston 9a which is secured to a crosshead 1c at the lower end of the mold unit 1. Since the mold unit 1 comprises two molds which define two mold cavities 7, 8, the shifting means 9, 9a is arranged to move this mold unit between two positions which are respectively shown in FIGS. 2 and 3. The programming system which controls angular movements of the platform 5 about its vertical axis, reciprocatory movements of the shooting cylinder 4a in the directions indicated by the arrow 4c, and up-and-down movements of the mold units 1, 2 and 3 is not shown in the drawings.

The operation of the machine shown in FIGS.1 to 3 will be readily understood. In the angular position shown in FIGS. 1 and 2, the cylinder 4a has its nozzle 4b located in a plane which includes the inlets 7a, 8a of the cavities 7, 8 in the mold unit 1. The nozzle 4b registers with the upper inlet 7a and is actually received therein because the cylinder 4a is shown in its left-hand end position. The closing and clamping mechanisms 1a, 1b of the mold unit 1 are operative so that the cylinder 4a can inject a charge of plasticized material which fills the cavity 7. The cylinder 4a is then moved in a direction to the right to withdraw the nozzle 4b from the inlet 7a and the programming system admits hydraulic fluid into the chamber 9b of the cylinder 9 to move the piston 9a and the mold unit 1 to the upper end position shown in FIG. 3. This programming system then causes the cylinder 4a to introduce its nozzle 4b into the inlet 8a and to admit plasticized material into the cavity 8.

The cylinder 4a is thereupon withdrawn and the turntable 5 is rotated to place the nozzle 4b into registry with the inlet of one of the mold cavities in the mold unit 2 or 3.

Figure 4:
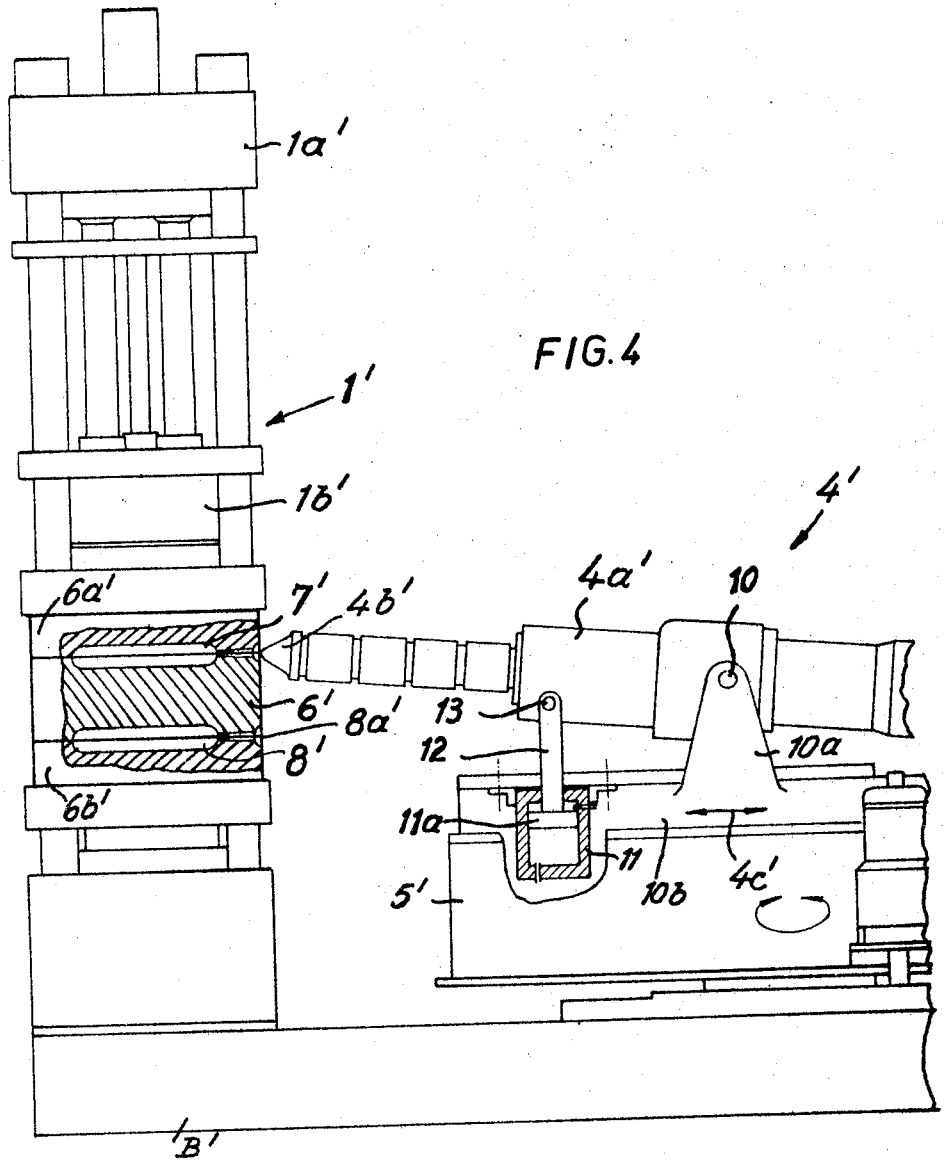
FIG. 4 is a fragmentary side elevational view of a second injection molding machine wherein the nozzle of the shooting cylinder is movable up and down to register with selected inlets in the mold units, the nozzle being shown in an upper end position.

The injection molding machine of FIGS. 4 and 5 comprises at least one but preferably two or more multi-stage mold units 1' each of which is fixedly secured to the base B'. The component parts of the mold unit 1' shown in FIGS. 4 and 5 are analogous to those of the mold unit 1 and are denoted by similar reference characters each followed by a prime.

This embodiment of my machine comprises a modified shooting unit 4' which again includes a turntable 5' for a shooting cylinder 4a' having a nozzle 4b'. The cylinder 4a' is rockable about the axis of horizontal pivot means 10 mounted in bearing brackets 10a carried by a slide 10b which is reciprocable in the turntable 5' in directions indicated by arrow 4c'. The shifting means comprises a double-acting hydraulic cylinder 11 mounted in the slide 10b and accommodating a piston 11a having a rod 12 which is articulately connected with the cylinder 4a' by a pin 13. In response to rocking of the cylinder 4a' about the horizontal axis of the pivot means 10, the nozzle 4b' may be moved between the upper level of FIG. 4 in which it registers with the inlet 7a' and the lower level of FIG. 5 to register with the inlet 8a'.

In response to rotation of the turntable 5', the shooting cylinder 4a' may be moved to one or more additional angular positions to place its nozzle 4b' into a plane including the planes of inlets 7a', 8a' in one or more additional fixed mold units.

It is further clear that the entire shooting cylinder 4a' could be moved up and down with or with reference to the turntable 5' so as to move its nozzle 4b' to the level of the inlet 7a' or 8a'. Also, each of the mold units 1–3 or 1' may be provided with three or more mold cavities and the shifting means is then arranged to move the mold units 1–3 or the nozzle 4b' to three or more different levels. The hydraulic shifting means for the mold units 1–3 or for the cylinder 4a' may be replaced by mechanical or other suitable types of motion transmitting devices.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In an injection molding machine, a multi-stage mold unit defining a row of mold cavities disposed above each other, each of said cavities having an inlet; a shooting unit having nozzle means for injecting plasticized material into one of said cavities at a time, said nozzle means being pivotable about a substantially horizontal axis; and means for pivoting said nozzle means about said axis to thereby move said nozzle means between a plurality of levels at each of which said nozzle means registers with one of said inlets.

2. A structure as defined in claim 1, wherein said shooting unit further comprises a shooting cylinder which is pivotable about said axis and supports said nozzle means, said means for pivoting the nozzle means comprising means for pivoting the shooting cylinder about said axis.

3. A structure as defined in claim 1, further comprising at least one additional multi-stage mold unit adjacent to said first mentioned mold unit, and means for moving said nozzle means about a substantially vertical axis between a plurality of angular positions in each of which said nozzle means can be pivoted into registry with the inlets of mold cavities of a different mold unit.

4. A structure as defined in claim 3, wherein said mold units are located at the same distance from said substantially vertical axis and wherein each of said inlets faces said last mentioned axis.

5. A structure as defined in claim 1, wherein the means for pivoting said nozzle means comprises at least one hydraulic cylinder and piston assembly.

6. A structure as defined in claim 1, wherein said mold unit comprises a plurality of superimposed molds composed of mold sections movable with reference to each other, said molds including a pair of adjoining molds having a common mold section.

7. A structure as defined in claim 1, wherein said nozzle means is reciprocable toward and away from said mold unit.

8. A structure as defined in claim 1, wherein the means for pivoting said nozzle means includes a turntable rotatable about a substantially vertical axis, pivot means supported by said turntable and defining said substantially horizontal axis, said pivot means being connected with said shooting unit, a double-acting hydraulic cylinder supported by said turntable between said pivot means and said mold unit and a piston reciprocably received in said cylinder and articulately coupled to said shooting unit.

9. A structure as defined in claim 8, further comprising a slide reciprocably mounted on said turntable for movement at right angles to said horizontal axis, said pivot means and said cylinder being mounted on said slide.

References Cited

UNITED STATES PATENTS

| | | | |
|---|---|---|---|
| 2,533,468 | 12/1950 | Jurgeleit | 18—30 |
| 3,205,536 | 9/1965 | Funck | 18—30 |
| 3,226,770 | 1/1966 | Senfleben. | |
| 3,266,086 | 8/1966 | Markevitch | 18—43 X |

FOREIGN PATENTS

| | | |
|---|---|---|
| 973,315 | 1/1960 | Germany. |
| 904,463 | 2/1954 | Germany. |
| 1,277,268 | 10/1961 | France. |
| 1,380,689 | 10/1964 | France. |
| 1,380,690 | 10/1964 | France. |

WILBUR L. McBAY, Primary Examiner

U.S. Cl. X.R.

18—4